United States Patent
Oono et al.

(10) Patent No.: US 9,085,664 B2
(45) Date of Patent: Jul. 21, 2015

(54) POLYVINYL ALCOHOL FILM, AND POLARIZING FILM AND POLARIZING PLATE USING THE SAME

(75) Inventors: Hideki Oono, Osaka (JP); Akihiko Chigami, Osaka (JP); Seiichirou Hayakawa, Osaka (JP)

(73) Assignee: The Nippon Synthetic Chemical Industry Co., Ltd., Osaka (JP)

( * ) Notice: Subject to any disclaimer, the term of this patent is extended or adjusted under 35 U.S.C. 154(b) by 1809 days.

(21) Appl. No.: 11/794,442

(22) PCT Filed: Dec. 19, 2005

(86) PCT No.: PCT/JP2005/023238
§ 371 (c)(1),
(2), (4) Date: Jun. 27, 2007

(87) PCT Pub. No.: WO2006/070627
PCT Pub. Date: Jul. 6, 2006

(65) Prior Publication Data
US 2007/0298234 A1  Dec. 27, 2007

(30) Foreign Application Priority Data
Dec. 28, 2004 (JP) .................... 2004-381185

(51) Int. Cl.
*B32B 27/32* (2006.01)
*C08J 5/18* (2006.01)
*B29C 41/26* (2006.01)
*G02B 5/30* (2006.01)
*B29K 29/00* (2006.01)

(52) U.S. Cl.
CPC . *C08J 5/18* (2013.01); *B29C 41/26* (2013.01); *G02B 5/3033* (2013.01); *B29K 2029/04* (2013.01); *B29K 2995/0031* (2013.01); *C08J 2329/04* (2013.01)

(58) Field of Classification Search
CPC ........... C08J 5/18; C08J 5/50; C08L 23/0815; B29C 43/003; B32B 27/08; B32B 27/32; B32B 27/00
USPC ........................................................ 428/220
See application file for complete search history.

(56) References Cited

U.S. PATENT DOCUMENTS

2006/0073340 A1*  4/2006  Shirai et al. ................. 428/411.1
2007/0042189 A1*  2/2007  Shirai et al. ................. 428/411.1

FOREIGN PATENT DOCUMENTS

| JP | 6-138319 | | 5/1994 |
| JP | 2002-28939 | | 1/2002 |
| JP | 2002028939 A | * | 1/2002 |
| JP | 2002-59475 | | 2/2002 |
| JP | 2002-60505 | | 2/2002 |

OTHER PUBLICATIONS

Machine_English_Translation_Shigeyuki Harita, Jan. 29, 2002, Polyvinyl Alcohol Polymer Film, Method for Manufacturing the Same, and Polarizing Film, JPO, whole document.*

* cited by examiner

*Primary Examiner* — Tahseen N Khan
(74) *Attorney, Agent, or Firm* — Hamre, Schumann, Mueller & Larson, P.C.

(57) ABSTRACT

The present invention provides a polyvinyl alcohol film which has a width of 3 m or more, an in-plane retardation value of 30 nm or less and a fluctuation of in-plane retardation value of 15 nm or less.

9 Claims, No Drawings

POLYVINYL ALCOHOL FILM, AND POLARIZING FILM AND POLARIZING PLATE USING THE SAME

TECHNICAL FIELD

The present invention relates to a polyvinyl alcohol film. More specifically, the invention relates to a polyvinyl alcohol film having a low birefringence and a process for producing the same, and a polarizing film and a polarizing plate obtainable from the above film, which is excellent in in-plane uniformity of polarization degree.

BACKGROUND ART

Hitherto, a polyvinyl alcohol film has been produced by dissolving a polyvinyl alcohol-based resin in a solvent such as water to prepare a stock solution, subsequently forming a film by a solution-casting method (hereinafter, referred to as a casting method), drying the film using a metal heating roll or the like, and, if necessary, subjecting it to a thermal treatment. The polyvinyl alcohol film thus obtained has been utilized in a large number of applications as a film excellent in transparency and dyeing property, and a polarizing film is cited as one of useful applications thereof. Such a polarizing film has been used as an elemental constituent element of liquid crystal displays and in recent years, its use has been extended to displaying equipments for which high definition and high reliability are required.

Under such circumstances, as the screen size of a liquid crystal television set or the like is enlarged, there has been desired a polarizing film more excellent in polarization performance, especially in-plane uniformity of polarization performance than conventional ones. In order to obtain a polarizing film excellent in in-plane uniformity of polarizing performance, it is important that the polyvinyl alcohol film to be used as a raw film of a polarizing film is optically homogeneous and, in particular uniformity of in-plane retardation value is important. As one solution, there is proposed a polyvinyl alcohol-based polymer film wherein the film width is 2 m or more, the difference of retardation values between two points which are 1 cm apart from each other in a width direction is 5 nm or less, and the difference of retardation values between two points which are 1 m apart from each other in a width direction is 50 nm or less (for example, see Patent Document 1). Moreover, there is proposed to use a polyvinyl alcohol film wherein the water content of the film at the time when it is peeled from a cast base material is set at less than 10% by weight (for example, see Patent Document 2).

Incidentally, in the following, the "retardation" means an "in-plane retardation value" unless otherwise stated.

However, even by these disclosed technologies, the retardation of the resulting polyvinyl alcohol film is not constant and unevenness may occur in a polarizing film produced using the polyvinyl alcohol film as a raw film. With regard to the polyvinyl alcohol film of Patent Document 1, in the case where the film width is 2 m or more, there is several tens nm of retardation difference between two points on the film and hence the film cannot meet recent demand that an optically homogeneous film having a width of 3 m or more be obtained. Furthermore, since the retardation itself is large, optical design of a whole polarizing plate becomes complex.

In general, with regard to a polyvinyl alcohol film, there appears a tendency that the retardation increases at the both ends and decreases at the central part. One cause thereof is that dehydrative shrinkage occurs during a drying step and a thermal treating step of the film and thus stress is apt to be imparted to the both end parts of the film. The stress is apt to be generated as the water content of the film decreases and the stress increases in the step where the water content becomes 20% by weight or less, particularly in the step where the water content becomes 10% by weight or less.

Moreover, as Patent Document 2, in the case where the water content of the film at the time when it is peeled from the casting base material is less than 10% by weight, unevenness of the retardation increases before the peeling step.

The unevenness of the retardation in a width direction becomes remarkable as the film is widened and, in the currently used polyvinyl alcohol film having a width of 2 m, unevenness of the retardation of about 10 nm is present between both ends and the central part. As the width of the film is widened, it becomes difficult to flatten the retardation in a width direction. This is a reason why an optically homogeneous film having a width of 3 m or more cannot be produced by the conventional production processes.

Patent Document 1: JP-A-2002-28939
Patent Document 2: JP-A-6-138319

DISCLOSURE OF THE INVENTION

Problems that the Invention is to Solve

An object of the invention is to provide a polyvinyl alcohol film having a small in-plane retardation value and a small fluctuation of in-plane retardation values in a width direction, which meets area enlargement and fineness enhancement of displays, as well as a polarizing film and further a polarizing plate, which are excellent in in-plane uniformity of polarization degree.

Means for Solving the Problems (1) A polyvinyl alcohol film, which has a width of 3 m or more, an in-plane retardation value of 30 nm or less, and a fluctuation of in-plane retardation value in a width direction of the film of 15 nm or less.

(2) The polyvinyl alcohol film according to the item (1), which has a thickness of from 30 to 70 µm.

(3) The polyvinyl alcohol film according to the item (1), which is used as a raw film of a polarizing film.

(4) A process for producing a polyvinyl alcohol film, comprising:
a step of forming a film by a casting method and
a step of thermally treating the film by plurality of hot rolls each having a surface temperature of 40° C. or higher,
wherein a contact time of any in-plane one point of the above film with each of the above hot rolls is from 1 to 6 seconds in the step of the thermal treatment.

(5) The process for producing a polyvinyl alcohol film according to the item (4), wherein the sum of the contact time of any in-plane one point of the above film with each of the above hot rolls is from 30 to 100 seconds.

(6) The process for producing a polyvinyl alcohol film according to the item (4), wherein each diameter of all the above hot rolls is from 150 to 500 mm.

(7) A process for producing a polyvinyl alcohol film, comprising:
a step of forming a film by a casting method and
a step of thermally treating the film by plurality of hot rolls each having a surface temperature of 40° C. or higher,
wherein a contact time of any in-plane one point of the above film with each of the above hot rolls is from 1 to 6 seconds in the step of the thermal treatment and the above film is the polyvinyl alcohol film according to the item (1).

(8) The process for producing a polyvinyl alcohol film according to the item (7), wherein the sum of the contact time of any in-plane one point of the above film with each of the above hot rolls is from 30 to 100 seconds.

(9) The polyvinyl alcohol film according to the item (7), wherein each diameter of all the above hot rolls is from 150 to 500 mm.

(10) A polarizing film formed of the polyvinyl alcohol film according to the item (1).

(11) A polarizing plate comprising the polarizing film according to the item (10) and a protective film provided on at least one surface of the above polarizing film.

Advantage of the Invention

Since the polyvinyl alcohol film of the invention has a low in-plane retardation value and a small fluctuation of the in-plain retardation value in a width direction, the film is preferably used as a raw film at the production of a polarizing film excellent in in-plane uniformity of polarization degree.

BEST MODE FOR CARRYING OUT THE INVENTION

The invention relates to a polyvinyl alcohol film which has a width of 3 m or more, an in-plane retardation value of 30 nm or less, and a fluctuation of in-plane retardation value of 15 nm or less.

The term "in-plane retardation value of the film is N or less" in the invention means that the in-plane retardation value of the film is N or less at any place of the film surface. In this connection, evaluation of the in-plane retardation value of the film is performed by determining plurality of measuring points in a width direction (TD) of the film to be measured and measuring each retardation value at each measuring point. The retardation value is a value defined by (nx−ny)×d wherein an in-plane maximum refractive index of the film at each measuring point is represented by nx, the refractive index of the film in a direction perpendicular to the direction of nx is represented by ny, and the thickness of the film is represented by d.

Moreover, the term "fluctuation of in-plane retardation value of the film in a width direction of the film" is an absolute value of a difference between a maximum value and a minimum value of the retardation values in the width direction of the film measured in the above.

The polyvinyl alcohol film of the invention is produced from a polyvinyl alcohol-based resin by the production method to be mentioned below. As the polyvinyl alcohol-based resin, there is usually employed a resin produced by saponifying polyvinyl acetate obtained by polymerization of vinyl acetate. However, in the polyvinyl alcohol film of the invention, the resin is not necessarily limited thereto and there may be also used resins obtained by saponifying copolymers of vinyl acetate with a small amount of a component copolymerizable with vinyl acetate. As the component copolymerizable with vinyl acetate, there may be mentioned an unsaturated carboxylic acid (inclusive of a salt, an ester, an amide or a nitrile); an olefin having 2 to 30 carbon atoms (ethylene, propylene, n-butene, isobutene, etc.); a vinyl ether; an unsaturated sulfonate salt; or the like.

The weight-average molecular weight of the polyvinyl alcohol-based resin of the invention is not particularly limited but the weight-average molecular weight measured by a gel permeation chromatograph-low angle laser light scattering method (hereinafter referred to as GPC-LALLS method) is preferably from 120,000 to 300,000, more preferably from 130,000 to 260,000, more preferably from 140,000 to 200,000. When the weight-average molecular weight is less than 120,000, sufficient optical performance is not obtained in the case where the polyvinyl alcohol film is used as an optical film. When the weight-average molecular weight exceeds 300,000, stretching is difficult in the case where the film is used as a polarizing film and thus industrial production is difficult. Thus, the cases are not preferred.

Moreover, the saponification degree of the polyvinyl alcohol-based resin is preferably 97 to 100% by mol, more preferably from 98 to 100% by mol, further preferably from 99 to 100% by mol. When the saponification degree is less than 97% by mol, a sufficient optical performance is not obtained in the case where the polyvinyl alcohol-based resin is used as an optical film, so that the case is not preferred.

The in-plane retardation value of the polyvinyl alcohol film of the invention is 30 mm or less, preferably from 5 to 30 nm, more preferably 5 to 25 nm, further preferably from 5 to 20 nm. In the case where the polyvinyl alcohol film is used as a raw film of a polarizing film, the retardation value remarkably increases in a stretching step. Therefore, in the case where the in-plane retardation value of the polyvinyl alcohol film as a raw film exceeds 30 nm, influence of the retardation of the whole film itself increases in the resulting polarizing film and polarizing plate and optical design of a liquid crystal cell becomes complex. Moreover, in the case where the in-plane retardation value of the raw film is not controlled to a specific range, the retardation value of the polarizing film largely fluctuates on every product and it becomes difficult to produce a liquid cell having a stable quality. Furthermore, a smaller in-plane retardation value of the film is more preferred. However, in the case where the in-plane retardation value of the polyvinyl alcohol film as a raw film is less than 5 nm, it is necessary to very strictly manage film formation conditions and the value is influenced by a little conditional change, so that productivity tends to be poor.

Moreover, fluctuation of in-plane retardation value of the polyvinyl alcohol film of the invention in a width direction is 15 nm or less, preferably 10 nm or less, more preferably 7 nm or less, further preferably 5 nm or less. Furthermore, a lower limit of the fluctuation of in-plane retardation value in the width direction of the film is 0 (zero) as is obvious from the above definition. In the case where the fluctuation of the retardation values in the width direction exceeds 15 nm, when the film is used as a raw film of a polarizing film, fluctuation of the polarizing degrees of the resulting polarizing film increases. In addition, a smaller fluctuation of in-plane retardation value in the width direction of the film is more preferred.

The width of the polyvinyl alcohol film of the invention is 3 m or more, preferably 3.5 m or more in view of productivity at the production of a polarizing film. Moreover, an upper limit of the film width is preferably 6 m or less since homogeneous stretching is sometimes difficult when the film is subjected to mono axial stretching at the production of the polarizing film. The thickness of the polyvinyl alcohol film of the invention is preferably from 30 to 100 μm, more preferably from 40 to 90 μm, particularly preferably 30 to 70 μm. When the thickness is less than 30 μm, stretching is difficult. When the thickness exceeds 100 μm, accuracy in film formation decreases. Thus, the cases are not preferred.

Light transmittance of the polyvinyl alcohol film of the invention is preferably 90% or more, more preferably 91% or more. An upper limit of the light transmittance is 95%.

Tensile strength of the polyvinyl alcohol film of the invention is preferably 70 N/mm$^2$ or more, more preferably 75 N/mm$^2$ or more. Moreover, an upper limit of the tensile strength is preferably 115 N/mm$^2$ or less, more preferably 110 N/mm$^2$ or less. In this connection, the tensile strength in the invention is tensile strength obtained by subjecting a test piece whose moisture is controlled under an environment of 20° C. and 65% RH to a tensile test at a tensile rate of 1000 mm/min under the same environment.

Complete dissolution temperature of the polyvinyl alcohol film of the invention is preferably 65° C. or higher, further preferably from 65 to 90° C., more preferably from 71 to 80° C. In this connection, the complete dissolution temperature in the invention is a temperature at which the film is completely dissolved at the time when 2000 ml of water is placed in a 2 L beaker and is warmed to a temperature of 30° C., then a film piece of 2 cm×2 cm is charged thereinto, and the water temperature is elevated at a rate of 3° C./minute under stirring. The thickness of the film piece is not particularly limited so far as it is from 30 to 70 μm.

In general, the polyvinyl alcohol film is produced by preparing an aqueous polyvinyl alcohol-based resin solution using the polyvinyl alcohol-based resin mentioned before and forming a film by casting the aqueous solution on a drum roll, followed by drying and, if necessary, a thermal treatment. The polyvinyl alcohol film of the invention can be, for example, produced by the production process described below.

The following will describe the process for producing the polyvinyl alcohol film of the invention.

The process for producing the polyvinyl alcohol film of the invention is a process comprising a step of forming a film by a casting method and a step of thermally treating the film by plurality of hot rolls each having a surface temperature of 40° C. or higher, wherein contact time of any in-plane one point of the above film with each of the above hot roll is from 1 to 6 seconds.

In this connection, the above "step of thermally treating" includes a step of drying the film and a step of a thermal treatment to which the film after drying is subjected.

In the process for producing the polyvinyl alcohol film of the invention, an aqueous polyvinyl alcohol-based resin solution containing the polyvinyl alcohol-based resin mentioned above is prepared. The concentration of the aqueous polyvinyl alcohol-based resin solution is preferably from 10 to 50% by weight, particularly preferably from 15 to 40% by weight, particularly preferably from 20 to 30% by weight. When the concentration is less than 10% by weight, a drying load becomes large and thus production capability is poor. When the concentration exceeds 50% by weight, the viscosity becomes too high to achieve homogeneous dissolution. Thus, the cases are not preferred.

Moreover, to the aqueous polyvinyl alcohol-based resin solution, if necessary, a commonly used plasticizer such as glycerin, diglycerin, triglycerin, ethylene glycol, or triethylene glycol and/or a nonionic, anionic, or cationic surfactant may be added.

At the preparation of the aqueous polyvinyl alcohol-based resin solution, the temperature condition for dissolving the resin is preferably from 50 to 200° C., further preferably from 100 to 150° C. When the temperature is less than 50° C., a load on a motor becomes large. When the temperature exceeds 200° C., degradation of the polyvinyl alcohol-based resin occurs. Thus, the cases are not preferred. Moreover, time for dissolving the resin is preferably from 1 to 20 hours, more preferably from 2 to 20 hours. When the time is less than 1 hour, dissolution is insufficient. When the time exceeds 20 hours, productivity is poor. Thus, the cases are not preferred.

Then, the resulting aqueous polyvinyl alcohol-based resin solution is subjected to a defoaming treatment. As the defoaming method, there may be mentioned defoaming on standing, defoaming by means of a multi-screw extruder, and the like. In the production process of the invention, the method of defoaming by means of a multi-screw extruder is preferred. The multi-screw extruder is not particularly limited so far as it is a multi-screw extruder with bent but usually, a twin-screw extruder with bent is used.

The defoaming treatment by means of a multi-screw extruder is carried out with feeding the aqueous polyvinyl alcohol-based resin solution into the multi-screw extruder under conditions of a resin temperature at the bent part of preferably 100 to 200° C., further preferably 110 to 150° C. and an extruder head resin pressure of preferably 2 to 100 kg/cm$^2$, further preferably 5 to 70 kg/cm$^2$. When the resin temperature at the bent part is less than 100° C., defoaming is insufficient. When the temperature exceeds 200° C., resin degradation may occur. Moreover, when the extruder head resin pressure is less than 2 kg/cm$^2$, defoaming is insufficient. When the pressure exceeds 100 kg/cm$^2$, resin leakage at piping or the like may occur and thus stable production becomes impossible.

After the defoaming treatment, the aqueous polyvinyl alcohol-based resin solution discharged from the multi-screw extruder is introduced into a T-form slit die a specific amount by a specific amount. Thereafter, the aqueous polyvinyl alcohol-based resin solution ejected from the slit die is cast and a film is formed.

As the T-form slit die, an elongated rectangular T-form slit die is usually employed.

Moreover, the resin temperature at the outlet of the T-form slit die is preferably from 80 to 100° C., more preferably from 85 to 98° C. When the resin temperature at the outlet of the T-form slit die is less than 80° C., flowability is insufficient. When the temperature exceeds 100° C., bubbles form. Thus, the cases are not preferred.

At the casting of the aqueous polyvinyl alcohol-based resin solution, a drum roll or an endless belt are commonly used but a drum roll is preferably used in view of widening and lengthening, uniformity of film thickness, and the like.

At the casting and film formation on the drum roll, for example, the rotation rate of the drum roll is preferably from 5 to 30 m/minute, particularly preferably from 6 to 20 m/minutes. The surface temperature of the drum roll is preferably from 70 to 99° C., more preferably from 75 to 97° C. When the surface temperature of the drum roll is less than 70° C., drying is insufficient. When the temperature exceeds 99° C., bubbles form in the film. Thus, the cases are not preferred. The size of the drum roll is not particularly limited so far as a film having a width of 3 m or more is formed but, for example, the diameter of the roll is preferably from 3100 to 5000 mm, more preferably from 3100 to 4000 mm.

The water content of the film after casting and film formation on a drum roll is preferably from 10 to 30% by weight, particularly preferably from 15 to 25% by weight. When the water content exceeds 30% by weight, it is difficult to peel the film from the roll and a load on the drying step increases, so that the case is not preferred. Moreover, when the content is less than 10% by weight, the retardation increases due to rapid water vaporization, so that the case is not preferred.

The film after film formation obtained by the above process is dried with bringing the front side and backside thereof into contact with the hot rolls alternately and then, if necessary, subjected to a thermal treatment. In the invention, the hot rolls mean rolls to be used in the subsequent step after the step of casting and forming the film using a drum roll by the casting method and rolls which have a heating device and whose surface temperature is 40° C. or more. In the case where the surface temperature of the rolls is lower than 40° C., drying efficiency is poor and the use of the hot rolls has little meaning. A roll having no heating device and only a function of only conveying the film does not correspond to the hot roll of the invention, even when the surface temperature thereof exceeds 40° C. Moreover, contact length between the film and the hot roll in a circumferential direction of the hot roll (hereinafter, referred to as contact length in a circumferential direction) is preferably one fourth or more of the circumference. In the case where the contact length is less than one fourth of the circumference, drying efficiency is poor and the use of the hot rolls has little meaning.

Usually, in the drying step and thermal treatment step of the polyvinyl alcohol film, film shrinkage occurs. In the case where the film is heated using the hot rolls, a complex shrinking stress may act on both of the flow direction and the width direction during the contact of the film with the roll and this stress may generate the retardation. Moreover, the longer the contact time between the film and the roll per each roll is, the larger the retardation value and unevenness are. In particular, since the contact length between the film and the roll in a width direction of the roll (hereinafter, referred to as contact length in a width direction) is large, there is a tendency that the retardation is large at the both end parts where the stress increases and is small at the central part. In this connection, the contact in this case does not necessarily mean complete close contact and also includes a case where a little space (air layer) is present.

In order to avoid such a problem of retardation unevenness, it is necessary to reduce the contact time between the film and the roll per roll. The contact length itself is not the point. Even when the contact length is long, the retardation is not generated when the film passes through within a short period of time. To the contrary, even when the contact length is short, the retardation increases when the film is heated on the roll for a long time. Therefore, it is a gist of the process for producing a polyvinyl alcohol film of the invention to eliminate the time for generating the stress.

As a specific method for reducing the time for generating the stress includes shortening of the diameter of each hot roll and enhancement of conveying rate. In the case where the amount of heat applied to the film is constant all over the production steps, the shortening of the diameter of the hot roll means increase in number of hot rolls. This may result in a premonition of decrease in productivity but the productivity can be maintained by enhancing the conveying rate. Moreover, since diligent stress relaxation among the rolls becomes possible, a film having no unevenness of retardation can be obtained in good yields.

Namely, in the process for producing a polyvinyl alcohol film of the invention, contact time of any in-plane one point of the above film with each of the above hot roll is from 1 to 6 seconds in the step of the thermal treatment of the film. The contact time is preferably from 1 to 5.5 seconds, more preferably from 2 to 5 seconds, particularly preferably from 2 to 4.5 seconds. When the contact time is less than 1 second, drying tends to be insufficient. When the time exceeds 6 seconds, the retardation of the film in a width direction increases. In this connection, the contact time can be controlled by adjusting the roll diameter of the hot roll and the conveying rate of the film.

Moreover, the sum of the contact time of any in-plane one point of the above film with each hot roll is preferably from 30 to 100 seconds, more preferably from 40 to 90 seconds, further preferably from 50 to 80 seconds. When the time exceeds 100 seconds, the retardation of the film increases, so that the case is not preferred. When the time is less than 30 seconds, drying is sufficient, so that the case is not preferred.

Furthermore, as a matter of course, the contact time depends on the conveying rate of the film. The conveying rate of the film is preferably from 4 to 15 m/minute, more preferably from 8 to 14 m/minute, particularly preferably from 9 to 13 m/minute. When the rate is less than 4 m/minute, the productivity is poor. When the rate exceeds 15 m/minute, drying tends to be insufficient. Thus, the cases are not preferred.

The total number of the hot rolls to be used in the step of thermally treating the film is preferably from 10 to 40 rolls, more preferably from 12 to 30 rolls, particularly preferably from 13 to 25 rolls. When the number is less than 10 rolls, drying is insufficient. When the number exceeds 40 rolls, a facility load increases. Thus, the cases are not preferred.

The diameter of the hot rolls is preferably from 150 to 500 mm (outer circumference of 471 to 1570 mm), more preferably from 200 to 450 mm (outer circumference of 628 to 1413 mm), further preferably from 250 to 400 mm (outer circumference of 785 to 1256 mm). When the diameter exceeds 500 mm, the retardation is apt to increase, so that the case is not preferred. Also, when the diameter is less than 150 mm, a contact area with the film is insufficient and thus drying efficiency tends to be poor. All the hot rolls preferably have a diameter within the above range.

Moreover, the contact length between the film and each hot roll in a circumferential direction is preferably from 200 to 1400 mm, more preferably from 300 to 1300 mm, further preferably from 400 to 1200 mm.

The width of the hot roll is not particularly limited so far as a film having a width of 3 m can be subjected to the treatment and the width is preferably from 3100 to 5000 mm, more preferably from 3200 to 4500 mm, particularly preferably from 3300 to 4200 mm.

Moreover, the distance between each two hot rolls is preferably from 0.5 to 10 mm, further preferably from 0.5 to 5 mm. However, in this case, it is unnecessary for all the distances between individual two rolls to be the same and the distances between individual two rolls may be different from one another.

The surface temperature of the hot roll is 40° C. or higher, preferably from 40 to 150° C., more preferably from 50 to 120° C., particularly preferably from 60 to 110° C. When the surface temperature is lower than 40° C., drying ability is poor. When the temperature exceeds 150° C., bad appearance may be invited. Thus, both cases are not preferred. The surface temperature of the hot roll is not necessarily constant. For example, the temperature may be high at the early stage of drying where water content is large and may be low at the later stage. Moreover, the thermal treatment performed for the purpose of crystallization and the like may be also performed using hot rolls having gradually raised temperature and the film may be cooled using hot rolls having gradually lowered temperature. Furthermore, after the drying and thermal treatment by the hot rolls, a thermal treatment by a floating method where the film is heated from both sides thereof with hot air. The temperature for the thermal treatment in this case is suitably from 50 to 150° C. and the time for the thermal treatment is suitably from 10 to 120 seconds.

The draw ratio of the hot rolls is preferably from 0.9 to 1.1, more preferably from 0.95 to 1.07, further preferably from 0.98 to 1.05. When the ratio is less than 0.9, the film comes loose at the conveyance. When the ratio exceeds 1.1, the retardation is increased by tensile stress. Thus, the cases are not preferred.

In the invention, the draw ratio is a numeral value determined from an expression: rotation rate of hot rolls (late stage)/rotation rate of hot rolls (early stage).

The water content of the film after the thermal treatment, namely drying (after a thermal treatment in the case of performing the thermal treatment) is preferably 5% by weight or less, more preferably from 1 to 4% by weight, further preferably from 2 to 3% by weight. When the content exceeds 5% by weight, bad appearance is apt to be invited at the storage of the film.

In the process for producing a polyvinyl alcohol film of the invention, a polyvinyl alcohol film having a low retardation, especially a small fluctuation of in-plane retardation value of the film in a width direction can be obtained by specifying the contact time between the film and the hot rolls in the step of thermally treating the film.

Moreover, the polyvinyl alcohol film of the invention can be also obtained by the following production process.

Namely, the polyvinyl alcohol film of the invention can be also obtained by a method comprising a step of forming a polyvinyl alcohol film from an aqueous polyvinyl alcohol-based resin solution by a casting method and drying the film and a step of thermally treating the polyvinyl alcohol film, which have been subjected to the drying step, in a hydrophobic liquid in the temperature range of 50 to 150° C.

Usually, the thermal treatment of the polyvinyl alcohol film obtained by drying after casting an aqueous polyvinyl alcohol-based resin solution and forming a film is performed with hot air of 50 to 150° C. or on a roll drum of 50 to 150° C. However, in the above production process, instead of the present method, the film is thermally treated in a hydrophobic liquid in the temperature range of 50 to 150° C.

The hydrophobic liquid herein is not particularly limited so far as it is liquid and hydrophobic in the temperature range of 50 to 150° C. It is preferred that the hydrophobic liquid has a heat conductivity higher than that of a gas such as air and does not deteriorate the polyvinyl alcohol film. As more preferred one, silicone oil may be mentioned in view of viscosity, surface tension, and corrosion resistance. Particularly preferably, in view of safety and handling property, dimethylsilicone oil and methylphenylsilicone oil may be mentioned.

By bring the film into contact with a liquid having a heat conductivity higher than that of air, the whole film can be thermally treated from both sides at a homogeneous temperature under a circumstance where unevenness of temperature which may be generated by the thermal treatment with hot air is as little as possible. Moreover, moisture in the film largely influences crystallization. In the thermal treatment with hot air, the moisture in the film is usually released to outside of the system, the water content always changes, and in-plane unevenness becomes large. Therefore, as the above production process, by the thermal treatment in the specific temperature range in the hydrophobic liquid, change of the water content in the film can be suppressed as far as possible and influence of the water content on crystallization degree can be reduced to eliminate uneven thermal treatment of the film, and thus the crystallization degree of in-plane and thickness direction of the film can be made homogeneous (elimination of a skin layer). As a result, the polyvinyl alcohol film of the invention excellent in uniformity of the in-plane retardation value can be obtained.

The temperature range of the thermal treatment in the production process is preferably from 50 to 150° C., more preferably from 80 to 140° C., particularly preferably from 90 to 120° C. When the temperature is lower than 50° C., the crystallization tends to be insufficient. When the temperature exceeds 150° C., the crystallization tends to run out of control. Time for the thermal treatment is preferably from 5 seconds to 5 minutes, further preferably from 10 seconds to 1 minute, particularly preferably from 15 seconds to 30 seconds. When the time is less than 5 seconds, the crystallization tends to be insufficient. When the time exceeds 5 minutes, the productivity tends to be poor. The thermal treatment may be carried out repeatedly using plurality of tanks for thermal treatment or may be carried out plurality of times using hydrophobic liquids different in kind and temperature.

The film after the thermal treatment in the hydrophobic liquid is washed with a solvent such as xylene, toluene, cyclohexane, diethyl ether, diisopropyl ether, methyl ethyl ketone, or methyl isobutyl ketone. The washing is performed preferably at 0 to 70° C., more preferably at 10 to 50° C. When the temperature is lower than 0° C., washing tends to be insufficient. When the temperature exceeds 70° C., an environmental load tends to be increased. The washing may be carried out repeatedly using plurality of washing tanks or may be carried out plurality of times using solvents different in kind and temperature. Moreover, after the washing, the solvent on the film surface may be dried by warm air, if necessary.

Alternatively, the polyvinyl alcohol film of the invention can be also obtained by the following production process.

Namely, the polyvinyl alcohol film of the invention can be obtained by the production process comprising a step of casting an aqueous polyvinyl alcohol-based resin solution to form a film by a casting method and drying the film, a step of subjecting the polyvinyl alcohol film after the drying step to a thermal treatment according to need, a step of cooling the polyvinyl alcohol film, which has been heated by the drying step and the thermal treatment, to 50° C. or lower, and a step of heating the cooled polyvinyl alcohol film to 50 to 100° C. prior to winding of the film on a roll.

The above drying method is not particularly limited and, for example, the drying can be performed by passing the front side and backside of the film alternately through drying rolls. The diameter of the drying roll is preferably from 100 to 1000 mm, more preferably from 150 to 900 mm, particularly preferably from 200 to 800 mm in the case of using the present production process. When the diameter of the drying roll is less than 100 mm, enormous number of rolls is necessary. When the diameter exceeds 1000 mm, film conveyance becomes unstable. Thus, the cases are not preferred. In the case of using the production process, the number of the drying rolls is usually from 2 or 30 rolls. The surface temperature of the drying roll is from 60 to 100° C., further preferably from 65 to 90° C. in the case of using the production process.

After the drying, the resulting film is subjected to a thermal treatment, if necessary. In the case of using the production process, the method for the thermal treatment is not particularly limited and, for example, it can be performed by a floating method or a contact heating method with roll(s).

In the production process, the film heated by the drying treatment and the thermal treatment as mentioned above is cooled to 50° C. or lower.

The cooling method is not particularly limited and, for example, the film can be cooled by a method with air blasting (floating method) or a method with roll(s). However, in order to avoid increase in birefringence of the film by rapid decrease in temperature, particularly, a method with air blasting is preferred and a method with blasting air of 10 to 40° C. is more preferred. The cooling is performed at a temperature higher than the temperature at which dew condensation occurs on the film and lower than the temperature at which re-alignment of molecular chain of the polymer constituting the film occurs. Namely, the cooling temperature is 50° C. or lower, preferably from 10 to 40° C., further from 20 to 35° C. The cooling time is not particularly limited but, when heat conduction to the inside of the film is considered, the time is preferably 5 seconds or more and is preferably 3 minutes or less where the productivity is not lowered. It is more preferably from 8 seconds to 2 minutes, further preferably from 10 seconds to 1 minute.

The cooled polyvinyl alcohol film is heated to 50 to 100° C. prior to winding on a roll.

The heating method is not particularly limited and, for example, the film can be heated by a method with air blasting (floating method) or a method with roll(s). However, in order to avoid increase in birefringence of the film by rapid increase in temperature, particularly, heating with warm air is preferred. The heating is performed at a temperature higher than the temperature at which re-alignment of molecular chain of the polymer constituting the film occurs and lower than the temperature at which crystallization occurs and new stress strain is generated. Namely, the heating temperature is preferably from 50° C. to 100° C., more preferably from 60 to 90° C., further preferably from 70 to 80° C. The heating time is not particularly limited but, when heat conduction to the inside of the film is considered, the time is preferably 5 seconds or more and is preferably 3 minutes or less where the productivity is not lowered. It is more preferably from 8 seconds to 2 minutes, further preferably from 10 seconds to 1 minute. Moreover, the time between the cooling step and the heating step, for example, the time from the point when the film reached the cooling temperature to the point when the film reached next heating temperature is preferably within 3 minutes in consideration of productivity.

The stress strain generated inside the resin during the film formation step is reduced by an appropriate thermal treatment, preferably by repeating the thermal treatment several times. Therefore, in the production process, it is preferred that a heat cycle consisting of a cooling step and a heating step is carried out at least once, preferably twice to 5 times, more preferably from 3 to 4 times. It is supposed that the stress relaxation phenomenon by the heat cycle is because the molecular chains constituting the polymer is re-aligned to be a stable state with no strain and the free volume of inside of the polymer is re-arranged so as to relax the strain. As a result, the polyvinyl alcohol film of the invention excellent in uniformity of the in-plane retardation value can be obtained.

The polyvinyl alcohol film of the invention can be obtained by the above-mentioned each production process. Also, a production process wherein the above production processes are combined may be employed.

Since the polyvinyl alcohol film of the invention has a small in-plane retardation value and a small fluctuation of in-plane retardation values in a width direction, it is preferably used as a raw film at the production of a polarizing film excellent in in-plane uniformity of polarization degree.

The following will describe the process for producing the polarizing film of the invention using the polyvinyl alcohol film of the invention.

The polarizing film of the invention is produced via steps of usual dyeing, stretching, crosslinking with boric acid, and thermal treatment. As a process for producing the polarizing film, there are a method of stretching of the polyvinyl alcohol film, dyeing by dipping it in a solution of iodine or a dichroic dye, and subsequent treatment with a boron compound, a method of simultaneous stretching and dyeing and subsequent treatment with a boron compound, a method of dyeing with iodine or a dichroic dye, stretching, and subsequent treatment with a boron compound, a method of dyeing and subsequent stretching in a solution of a boron compound, and the like method, which can be suitably selected and used.

Thus, the polyvinyl alcohol film (unstretched film) may be subjected to stretching, dyeing, and further treatment with a boron compound separately or simultaneously. However, in view of productivity, it is desirable to carry out uniaxial stretching during at least one step of the dyeing step and the step of treatment with a boron compound.

The stretching is desirably conducted at a magnification of preferably 3 to 10 times, further preferably 3.5 to 6 times in a uniaxial direction. On this occasion, it is also possible to slightly stretch in a direction perpendicular to the stretching direction (stretching of a degree so as to prevent shrinkage in a width direction or more degree). The temperature at stretching is desirably selected from 40 to 170° C. Furthermore, stretching magnification may be finally set within the above range and the stretching operation may be carried out not only at one stage but also at any range of stages in the production steps.

The dyeing of the polyvinyl alcohol film is generally carried out by bringing the film into contact with a liquid containing iodine or a dichroic dye. Usually, an aqueous solution of iodine-potassium iodide is used and it is preferable that concentration of iodine is from 0.1 to 20 g/L, concentration of potassium iodide is from 10 to 50 g/L, a weight ratio of potassium iodide/iodine is from 20 to 100. Dyeing time is practically from about 30 to 500 seconds. Temperature of the treating bath is preferably from 5 to 50° C. In addition to water solvent, it is possible to incorporate an organic solvent compatible with water. As a means for the contact, any means such as dipping, applying, and spraying can be applied.

The film subjected to the dyeing treatment is generally treated with a boron compound. As the boron compound, boric acid or borax is practical. The boron compound is preferably used in a form of an aqueous solution or a mixed solution of water-organic solvent in a concentration of about 0.5 to 2 mol/L. In the solution, coexistence of a small amount of potassium iodide is practically desirable. A dipping method is desirable as the treating method but an applying method or a spraying method is also practicable. Temperature at the treatment is preferably about 50 to 70° C. and treating time is preferably from about 5 to 20 minutes. Moreover, if necessary, a stretching operation may be conducted during the treatment.

The polarizing film of the invention thus obtained can be used as a polarizing plate having a protective film on at least one surface thereof. The protective film is preferably an optically isotropic polymer film or polymer sheet. As such a protective film, there may be, for example, mentioned a film or sheet of cellulose triacetate, cellulose diacetate, polycarbonate, polymethyl methacrylate, polystyrene, a polyether sulfone, a polyarylene ester, poly-4-methylpentene, polyphenylene oxide, a cyclo-type polyolefin, or a norbornene-based polyolefin, or the like.

Moreover, onto the polarizing film, for the purpose of thinning the film, instead of the above protective film, it is also possible to apply a curable resin such as a urethane-based resin, acrylic resin, or a urea resin on one surface or both surfaces thereof to effect lamination.

The polarizing film (inclusive of the film having a protective film or a curable resin laminated on at least one surface) is sometimes put into a practical use after formation of a transparent pressure-sensitive adhesive layer on one surface thereof, if necessary, by a method commonly known. As the pressure-sensitive adhesive layer, particularly preferred is one mainly comprising a copolymer of an acrylate ester such as butyl acrylate, ethyl acrylate, methyl acrylate, or 2-ethylhexyl acrylate with an α-monoolefinic carboxylic acid such as acrylic acid, maleic acid, itaconic acid, methacrylic acid, or crotonic acid (inclusive of a copolymer wherein a vinyl monomer such as acrylonitrile, vinyl acetate, or styrene is added) since polarizing properties of the polarizing film are not inhibited. However, any pressure-sensitive adhesive having transparency can be used without limitation thereto and polyvinyl ether-based one or rubber-based one may be used.

A polarization degree of the polarizing film of the invention thus obtained is preferably 99.5% or more, more preferably from 99.8% or more. When the polarization degree is less than 99.5%, there is a tendency that contrast of a liquid crystal display cannot be assured. In this connection, an upper limit of the polarization degree of the polarizing film is 100%.

Incidentally, the polarization degree is calculated according to the following expression from light transmittance ($H_{11}$) measured at a wavelength $\lambda$ in a state that two polarizing films are overlaid so that orientation directions thereof are the same and light transmittance ($H_{\perp}$) measured at a wavelength $\lambda$ in a state that two polarizing films are overlaid so that orientation directions thereof are orthogonal to each other.

$$[(H_{11}-H_{\perp})/(H_{11}+H_{\perp})]^{1/2}$$

Moreover, the fluctuation of polarization degrees of the polarizing film of the invention in a width direction is preferably 0.5% or less, more preferably 0.3% or less. When the fluctuation of polarization degrees exceeds 0.5%, color unevenness tends to be generated in liquid crystal displays.

Incidentally, the "fluctuation of the polarization degrees" in the invention is a value defined as a difference (an absolute value) between a maximum value and a minimum value of the polarization degrees at the time when the polarization degree is measured over the whole width of a polarizing film in a width direction.

The single transmittance of the polarizing film of the invention is preferably 43% or more, particularly preferably 44% or more. When the transmittance is less than 43%, there is a tendency that high luminance of a liquid crystal display cannot be achieved. In this connection, an upper limit of the single transmittance of the polarizing film is 46%.

The polarizing film of the invention is preferably used in electronic desk calculators, electronic clocks or watches, word processors, personal computers, handy information terminals, liquid crystal display devices such as instruments for automobiles and machines, sunglasses, eye-protective glasses, 3D glasses, reflection-reducing layers for display devices (CRT, LCD, etc.), medical equipments, building materials, toys, and the like.

EXAMPLES

The following will specifically describe the invention with reference to Examples but the invention is not limited to these Examples unless it exceeds the gist. In Examples, "part(s)" and "%" mean "part(s) by weight" and "% by weight", respectively unless otherwise noted.

(1) Weight-Average Molecular Weight

It is measured under the following conditions by a GPC-LALLS method.

1) GPC

Apparatus: 244 type gel permeation chromatograph manufactured by Waters
Column: TSK-gel-GMPW$_{XL}$ manufactured by Tosoh Corporation (inner diameter of 8 mm, length of 30 cm, two columns)
Solvent: 0.1M Tris buffer solution (pH 7.9)
Flow rate: 0.5 ml/minute
Temperature: 23° C.
Sample concentration: 0.040%
Filtration: 0.45 μm MAISHORI Disk W-25-5 manufactured by Tosoh Corporation
Injection amount: 0.2 ml
Detection sensitivity (differential refractometer detector): 4 magnifications

2) LALLS

Apparatus: KMX-6 type low angle laser light scattering photometer manufactured by Chromatrix
Temperature: 23° C.
Wavelength: 633 nm
Second virial coefficient×concentration: 0 mol/g
Refractive index change (dn/dc): 0.159 ml/g
Change in refractive index with concentration: 0.159 ml/g
Filter: 0.45 μm filter HAWP01300 manufactured by MILLIPORE
Gain: 800 mV (2) In-Plane Retardation Value The resulting film was cut into a size of width (length of TD) 3000 mm×length (length of MD) 50 mm to prepare a strip sample. On the resulting sample, measuring points were determined at constant intervals of 10 mm in a width direction over the whole width using KOBRA-21SDH (manufactured by Oji Scientific Instruments) and in-plane retardation values of the sample at individual measuring points were measured. Table 2 shows the range of the resulting retardation values, an average value, and an absolute value of a difference between a maximum value and a minimum value of the retardation values as fluctuation thereof.

(3) Polarization Degree

The resulting polarizing film cut into a size of width (length of TD) 1000 mm×length (length of MD) 50 mm to prepare a strip sample. On the resulting sample, polarization degrees were measured at 10 mm pitch in a width direction over the whole width using a Multi Channel Retardation Measuring System (RETS-2000 manufactured by Otsuka Electronics Co., Ltd.; wavelength: 550 nm). Table 2 shows a range of the resulting polarization degrees, an average value, and an absolute value of a difference between a maximum value and a minimum value of the retardation values as fluctuation thereof.

Example 1

Production of Polyvinyl Alcohol Film

In a 200 L tank were placed 40 kg of a polyvinyl alcohol-based resin having a weight-average molecular weight of 142,000 and a saponification degree of 99.8% by mol, 100 kg of water, 4.2 kg of glycerin as a plasticizer, and 42 g of polyoxyethylene-dodecylamine as a releasing agent, and the whole was heated to 150° C. under stirring to obtain a homogeneously dissolved aqueous polyvinyl alcohol-based resin solution having a resin concentration of 25%. Then, after the resulting aqueous polyvinyl alcohol-based resin solution was fed to a twin-screw extruder and subjected to defoaming, the solution was cast from a T-type slit die onto a drum roll to form a film. The casting/film formation conditions are as follows.

Drum roll

Diameter: 3 m, Width: 3.3 m, Rotation rate: 10 m/minute, Surface temperature: 90° C., Resin temperature at outlet of T-type slit die: 95° C.

The water content of the film obtained after film formation was 23%. Then, the front side and backside of the film were alternately brought into contact with hot rolls under the following conditions to effect drying.

Hot roll (Drying roll)

Diameter: 350 mm, Width: 3.3 m, Rotation rate: 10 m/minute, Surface temperature: 80° C., Contact length between the film and each roll: 550 mm (contact time of 3.3 seconds)

The sum of the contact time between the film and the hot rolls was 59 seconds. Then, a thermal treatment (conditions: floating dryer (120° C., length of 6 m) was further performed. The water content of the film after the thermal treatment was 4%. Table 2 shows retardation values of the resulting polyvinyl alcohol film (width of 3 m, thickness of 50 μm). In this connection, a minimum value of the retardation was obtained at the central part of the film and a maximum value was obtained at the both end parts.

Production of Polarizing Film

The resulting polyvinyl alcohol film was dipped in an aqueous solution composed of 0.2 g/L of iodine and 15 g/L of potassium iodide at 30° C. for 240 seconds and then was dipped in an aqueous solution (55° C.) having a composition of 60 g/L of boric acid and 30 g/L of potassium iodide with simultaneous uniaxial stretching at a magnification of 4 times. Thereafter, the film was dried to obtain a polarizing film. Table 2 shows polarizing degrees of the resulting polarizing film.

Examples 2 to 6, Comparative Examples 1 and 2

Polyvinyl alcohol films and polarizing films were obtained in the same manner as in Example 1 with the exception of the conditions shown in Table 1. Performance of the polyvinyl alcohol films and the polarizing films are as shown in Table 2.

While the invention has been described in detail and with reference to specific embodiments thereof, it will be apparent to one skilled in the art that various changes and modifications can be made therein without departing from the spirit and scope thereof.

The present application is based on Japanese Patent Application No. 2004-381185 filed on Dec. 28, 2004, and the contents are incorporated herein by reference.

INDUSTRIAL APPLICABILITY

According to the present invention, there can be obtained a polyvinyl alcohol film having a small in-plane retardation value and a small fluctuation of in-plane retardation values in a width direction. Moreover, since the polyvinyl alcohol film of the invention is excellent in optical homogeneity, the film can be used as a raw film at the production of a polarizing film excellent in in-plane uniformity of polarization degree.

The invention claimed is:
1. A polyvinyl alcohol film,
wherein the film has a width of 3 m or more,
the film has in-plane retardation values of 30 nm or less obtained at measuring points placed at one cm intervals in a width direction across an entire width of the film,
the film has a fluctuation of the in-plane retardation values of 15 nm or less among the in-plane retardation values obtained at the measuring points, and
the film has a thickness in a range from 30 to 70 μM prior to being subjected to a stretching treatment for producing a polarizing film.

2. The polyvinyl alcohol film according to claim 1, which is used as a raw film of a polarizing film.

TABLE 1

| | Diameter of hot roll (mm) | Contact length with each hot roll (mm) | Conveying rate of film (m/minute) | Contact time with each roll (second) | Number of hot roll (roll) | Sum of contact time with hot roll (second) | Water content (% by weight) |
|---|---|---|---|---|---|---|---|
| Example 1 | 350 | 550 | 10 | 3.3 | 18 | 59 | 4 |
| Example 2 | 350 | 550 | 8 | 4.1 | 20 | 82 | 3 |
| Example 3 | 350 | 550 | 6 | 5.5 | 13 | 72 | 3 |
| Example 4 | 350 | 550 | 12 | 2.8 | 25 | 70 | 4 |
| Example 5 | 450 | 710 | 12 | 3.6 | 20 | 72 | 4 |
| Example 6 | 450 | 710 | 8 | 5.3 | 18 | 95 | 2 |
| Comparative Example 1 | 640 | 1000 | 8 | 7.5 | 10 | 75 | 3 |
| Comparative Example 2 | 450 | 710 | 6 | 7.1 | 18 | 128 | 2 |

TABLE 2

| | Retardation value of film | | | Polarization degree of polarizing film | | |
|---|---|---|---|---|---|---|
| | Range of measured values (mm) | Average value (mm) | Fluctuation (mm) | Range of measured values (%) | Average value (%) | Fluctuation (%) |
| Example 1 | 15 to 20 | 18 | 5 | 99.8 to 99.9 | 99.9 | 0.1 |
| Example 2 | 17 to 25 | 21 | 8 | 99.7 to 99.9 | 99.8 | 0.2 |
| Example 3 | 15 to 29 | 22 | 14 | 99.5 to 99.8 | 99.7 | 0.3 |
| Example 4 | 18 to 22 | 20 | 4 | 99.8 to 99.9 | 99.9 | 0.1 |
| Example 5 | 14 to 22 | 18 | 8 | 99.7 to 99.9 | 99.8 | 0.2 |
| Example 6 | 17 to 29 | 23 | 12 | 99.5 to 99.8 | 99.6 | 0.3 |
| Comparative Example 1 | 29 to 53 | 39 | 24 | 98.9 to 99.5 | 99.2 | 0.6 |
| Comparative Example 2 | 24 to 49 | 37 | 25 | 99.1 to 99.7 | 99.4 | 0.6 |

3. The polyvinyl alcohol film according to claim 1, wherein the polyvinyl alcohol film has light transmittance of 90% or higher.

4. The polyvinyl alcohol film according to claim 1, wherein a complete dissolution temperature in water of the polyvinyl alcohol film is 65° C. or higher.

5. A polarizing film, which is formed of the polyvinyl alcohol film according to claim 1.

6. A polarizing plate comprising the polarizing film according to claim 5 and a protective film provided on at least one surface of the polarizing film.

7. A process for producing a polyvinyl alcohol film, comprising:
    a step of forming a film by a casting method; and
    a step of thermally treating the film by a plurality of hot rolls each having a surface temperature of 40° C. or higher,
    wherein a contact time at any one in-plane point of the film with each of the hot rolls is from 1 to 6 seconds in the step of the thermal treatment,
    the polyvinyl alcohol film has a width of 3 m or more,
    the film has in-plane retardation values of 30 nm or less obtained at measuring points placed at one cm intervals in a width direction across an entire width of the film,
    the film has a fluctuation of the in-plane retardation values of 15 nm or less among the in-plane retardation values obtained at the measuring points, and
    the film has a thickness in a range from 30 to 70 μm prior to being subjected to a stretching treatment for producing a polarizing film.

8. The process for producing a polyvinyl alcohol film according to claim 7, wherein a sum of the contact time at any one in-plane point of the film with each of the hot rolls is from 30 to 100 seconds.

9. The process for producing a polyvinyl alcohol film according to claim 7, wherein a diameter of all of the hot rolls is from 150 to 500 mm.

* * * * *